US009976607B2

(12) United States Patent
Murari

(10) Patent No.: US 9,976,607 B2
(45) Date of Patent: May 22, 2018

(54) DEVICE FOR THE AUTOMATIC DISENGAGEMENT OF A CLUTCH IN AN ENGINE, CLUTCH AND GEARBOX SYSTEM

(71) Applicant: Christian Murari, San Giorgio di Piano (IT)

(72) Inventor: Christian Murari, San Giorgio di Piano (IT)

( * ) Notice: Subject to any disclaimer, the term of this patent is extended or adjusted under 35 U.S.C. 154(b) by 0 days. days.

(21) Appl. No.: 15/039,389

(22) PCT Filed: Dec. 2, 2014

(86) PCT No.: PCT/IB2014/066523
§ 371 (c)(1),
(2) Date: May 25, 2016

(87) PCT Pub. No.: WO2015/083081
PCT Pub. Date: Jun. 11, 2015

(65) Prior Publication Data
US 2017/0051799 A1 Feb. 23, 2017

(30) Foreign Application Priority Data
Dec. 2, 2013 (IT) .............................. BO2013A0672

(51) Int. Cl.
*F16D 43/21* (2006.01)
*F16D 41/22* (2006.01)
(Continued)

(52) U.S. Cl.
CPC .......... *F16D 43/216* (2013.01); *F16D 13/56* (2013.01); *F16D 13/71* (2013.01); *F16D 41/22* (2013.01); *F16D 2013/565* (2013.01)

(58) Field of Classification Search
CPC ... F16D 13/53; F16D 2013/565; F16D 43/216
See application file for complete search history.

(56) References Cited

U.S. PATENT DOCUMENTS

| 5,617,938 A | 4/1997 | Honda |
| 7,721,862 B2 * | 5/2010 | Kataoka ................. F16D 13/56 192/54.5 |

(Continued)

FOREIGN PATENT DOCUMENTS

| DE | 195 36 424 A1 | 4/1996 |
| DE | 297 00 807 U1 | 2/1997 |
| EP | 1 555 450 A1 | 7/2005 |

OTHER PUBLICATIONS

International Search Report (ISR) dated May 7, 2015 for International application No. PCT/IB2014/066523, 3 pages.
(Continued)

*Primary Examiner* — Ramya P Burgess
*Assistant Examiner* — David R Morris
(74) *Attorney, Agent, or Firm* — Ware, Fressola, Maguire & Barber LLP

(57) ABSTRACT

The device (10) is associated to a multidisk clutch (1) for motor vehicles, and allows the automatic disengagement thereof in the deceleration and/or braking initial phase, before that the driver operates the clutch lever (1) for downshifting. The device (10) includes a ramped plate (11) connected to the transmission, which features front cam profiles (110) adapted to actuate oscillating rocker arms (13), arranged inside a drum (5) provided in the clutch (1), when a back torque is generated by the drive wheel of the vehicle, during the deceleration and/or braking step. The rocker arms (13) rotate simultaneously from an inoperative position (N) to an operative position (H), causing the pusher plate (9) to move away with a reduction of the pressure exerted on the sets of friction rings (4, 7), which, therefore, can slip with respect to one another. This avoids abnormal blockages of the rear wheel and improves the drivability and curving of the motor vehicle.

10 Claims, 3 Drawing Sheets

(51) Int. Cl.
*F16D 13/56* (2006.01)
*F16D 13/71* (2006.01)

(56) References Cited

U.S. PATENT DOCUMENTS

| | | | |
|---|---|---|---|
| 2005/0150736 A1 | 7/2005 | Kataoka et al. | |
| 2006/0096829 A1* | 5/2006 | Kataoka | F16D 13/56 192/54.5 |
| 2008/0308382 A1* | 12/2008 | Kataoka | F16D 13/56 192/93 R |
| 2013/0025997 A1* | 1/2013 | Kataoka | F16D 13/56 192/70.23 |

OTHER PUBLICATIONS

Written Opinion of the International Searching Authority (ISA), 5 pages.

* cited by examiner

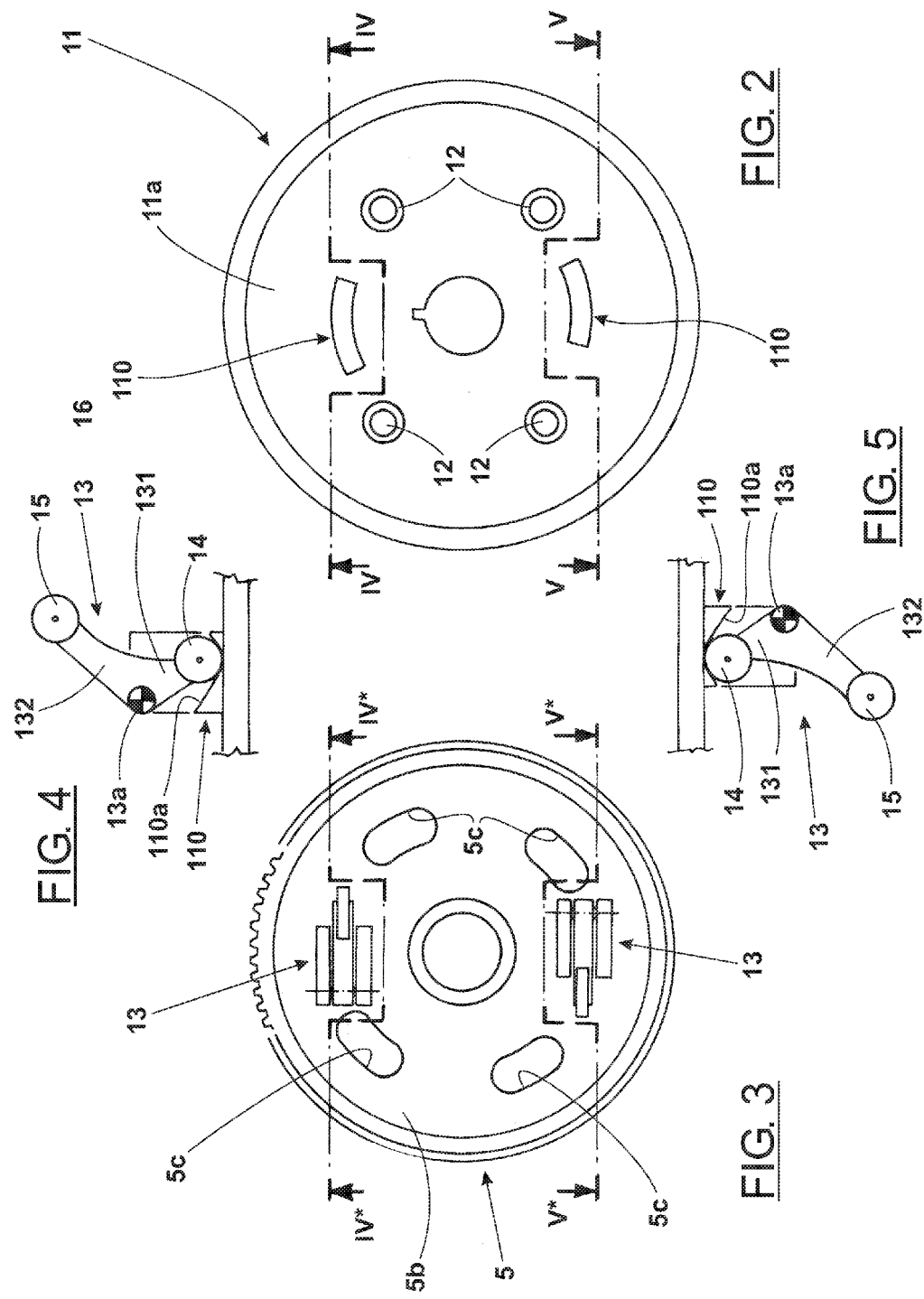

DEVICE FOR THE AUTOMATIC DISENGAGEMENT OF A CLUTCH IN AN ENGINE, CLUTCH AND GEARBOX SYSTEM

TECHNICAL FIELD

The invention relates to the field of engine technology, and mainly to that applied in the motorcycle field.

In all engines, not only the motorcycle ones, in which optimizing performance and driving safety are important, the maximum reduction of reciprocating masses is sought, in order to increase the number of turns. Also the reduction of the flywheel mass is desired, to allow rapid increases in the motor rotation speed during acceleration, which correspond to equally rapid speed declines during deceleration.

While the device of the invention can be advantageously used also in other fields, such as the automobile one, in the following, reference will be made to its application in the motorcycle field, for the purpose of example only.

BACKGROUND ART

In motorcycles the clutch is almost always a multidisc type (dry or oil-bath), to contain the overall dimensions of engine casings, and consists basically of: a basket, in mesh engagement with the crankshaft output, which firmly drive in rotation a first set of friction rings, placed within the basket itself; a drum, keyed onto a gear shaft (either the primary or the secondary one), arranged coaxially within the basket and said friction rings and provided, in its outer lateral surface, with a toothing, with which a second set of friction rings are engaged, which are interleaved with the rings of said first set; a pressure plate, associated axially to said drum with interposition of spring-loaded members, designed to push the pressure plate itself to compact and press the pack of the rings of said first and second sets, thus locking them to each other by friction; manually operated control means, designed to act on the pressure plate, against the elastic reaction of said spring-loaded members, to move it away from the aforementioned pack of rings and cause the disengagement of the clutch.

A conventional clutch assembly, as described above, in the engaged position, determines an actual rigid connection between the drive motor, the transmission and the driving wheel, the dimensioning being such as to be capable to transmit the maximum torque developed by the engine without slippage.

TECHNICAL PROBLEM

According to the motorcycle driving technique, in particular for competition motorcycles, the braking action is mainly on the front wheel, on which the maximum load is transferred. The rear (drive) wheel, on the contrary, almost completely unloaded and sometimes raised from the ground, is not caused to brake to prevent locking thereof, which would lead to meandering and instability of the vehicle, thus compromising cornering.

In each driving phase, where the speed of the vehicle must be reduced drastically and in a short time, the release of the accelerator, which produces a sudden drop of engine revolutions, and a violent braking occur virtually at the same time. During this phase, by inertia, the rear wheel tends to rotate faster than that which would be necessary at that time. This trend is also transmitted to the gearbox and the rest of the transmission downstream of the clutch, which are mechanically coupled to the rear wheel. During the transient time before the manual action on the clutch lever for shifting down, this results in what, in technical terms, is called back torque, i.e. a torque that goes back over the drivetrain and reaches the clutch, which is still engaged.

In the transitional time being considered, this back torque acts on means which tend to rotate at a speed higher than that which would be determined by the engine: because the engaged clutch behaves as a rigid coupling, usually an undesired situation occurs: in particular, in the above mentioned raising and braking condition, the engine brake effect prevails, with abrupt slowdown in the transmission speed and with the wheel which tends to stop and, if the action is particularly violent, to hop.

There are known devices, known as antilock and anti hopping systems, associated with multi-disk clutches for motorcycles, which exploit the back torque to obtain an automatic, at least partial disengagement of the clutch, in the transitional time as mentioned above, which precedes actuation of the lever.

With different technical solutions, the aforementioned disengagement is determined by an action intended to slightly release the pressure on the pack of friction rings, causing a slippage between those connected to the basket, and then to the motor, and those connected to the drum, then to the drive.

In some embodiments, such disconnection is obtained with an axial translation of the drum in the direction opposite to the basket, while in others this occurs due to an action on the pressure plate equal to that caused by the control means linked to the lever. The drawbacks with such anti hopping devices concern, on the one hand, the difficult adjustment, and, on the other hand, the lack of progressivity of the action. These drawbacks derive mainly from the characteristics of the various technical solutions, in which the above mentioned translations occur in the presence of strong friction, the value of which can vary from one situation to another.

OBJECTS OF THE INVENTION

Object of the present invention is therefore to propose a device for the automatic disengagement of a clutch in an engine, clutch and mechanical gearbox system designed in such a way as to overcome the drawbacks of the known devices, so that operation thereof is smooth and progressive.

Another object of the invention is to provide a device in which the action of automatic disengagement occurs without axial displacement of the drum, and with means acting with low friction.

Yet another object of the invention is to provide a device which does not involve increases in size of the clutch assembly to which it is associated, and which does not entail variations in the shape of the crankcase in which the same assembly is housed.

A further object of the invention aims to provide a device in which the response parameters can be adjusted in a simple and effective way, in order to adapt the operation to the specific characteristics of the vehicle and/or preferences of the rider.

Yet another object of the invention is to propose an automatic disengagement device, which is able to operate as a security tool in situations in which the tires have poor adherence to the asphalt, such as situations with wet asphalt or with presence of sand or gravel on the path of the vehicle.

Yet another object of the invention is to maintain the production costs of the device within acceptable limits, in absolute terms, and in any case advantageous with respect to the performance offered.

SUMMARY OF THE INVENTION

These and other objects are fully achieved by a device for the automatic disengagement of a clutch in an engine, clutch and mechanical gearbox system, in which the clutch includes: a basket, in mesh engagement with the crankshaft output, which firmly drive in rotation a first set of friction rings; a drum, connected to a gear shaft arranged coaxially within the basket and provided, in its outer lateral surface, with a toothing, with which a second set of friction rings are engaged; a pressure plate, associated axially to the drum with interposition of spring-loaded members, designed to push the pressure plate to compact and press the pack of the rings of said first and second sets; manually operated control means, designed to act on the pressure plate, to move it away from the pack of rings and cause the gradual disengagement of the clutch.

In particular, the clutch disengagement device includes:

a ramped plate, keyed onto a gear shaft, coaxially linked to the drum and provided with a series of studs, which are parallel to the shaft axis and protrude to the inside of the drum through respective arc-like slots made in the latter, and intended for locking rotation of the drum, with the possibility of a predetermined angular offset between it and the ramped plate;

at least two front cam profiles, made in the side of the ramped plate facing the inside of the drum, which define ascending ramps progressively moving away from the same side;

at least two rocker arms, arranged in symmetrical positions within the drum, pivoted to the latter at their intermediate fulcrums, each of the rocker arms being provided, at the ends, of bearings, the first of which is intended to contact one of the aforementioned ascending ramps, and the second being adapted to act on the pressure plate with possible interposition of one or more shims, the aforesaid rocker arm oscillating simultaneously, as a result of an angular offset of the ramped plate with respect to said drum, from an inoperative position, in which they push the pressure plate, to an operative position, in which the same rocker arms move the pressure plate away from the drum, so as to disengage, at least partially, the clutch.

BRIEF DESCRIPTION OF THE DRAWINGS

The characteristics of the invention will become evident from the following description of some preferred embodiments of the above mentioned device for the automatic disengagement of a clutch in an engine, clutch and mechanical gearbox system, in accordance with the contents of the claims and with the help of the enclosed figures, in which:

FIG. 2 shows a front view of a ramped plate, keyed on a gear shaft, according to the plane II-II of FIG. 1;

FIG. 3 shows a front view of a drum belonging to the above mentioned clutch assembly and associated with the ramped plate of FIG. 1, according to the plane III-III of FIG. 1;

FIG. 4 shows a view according to the plane IV-IV of FIG. 2, and including a view according to the plane IV*-IV* of FIG. 3;

FIG. 5 shows a view according to the plane V-V of FIG. 2, and including a view according to the plane V*-V* of FIG. 3;

DESCRIPTION OF PREFERRED EMBODIMENTS OF THE INVENTION

Figure 1:
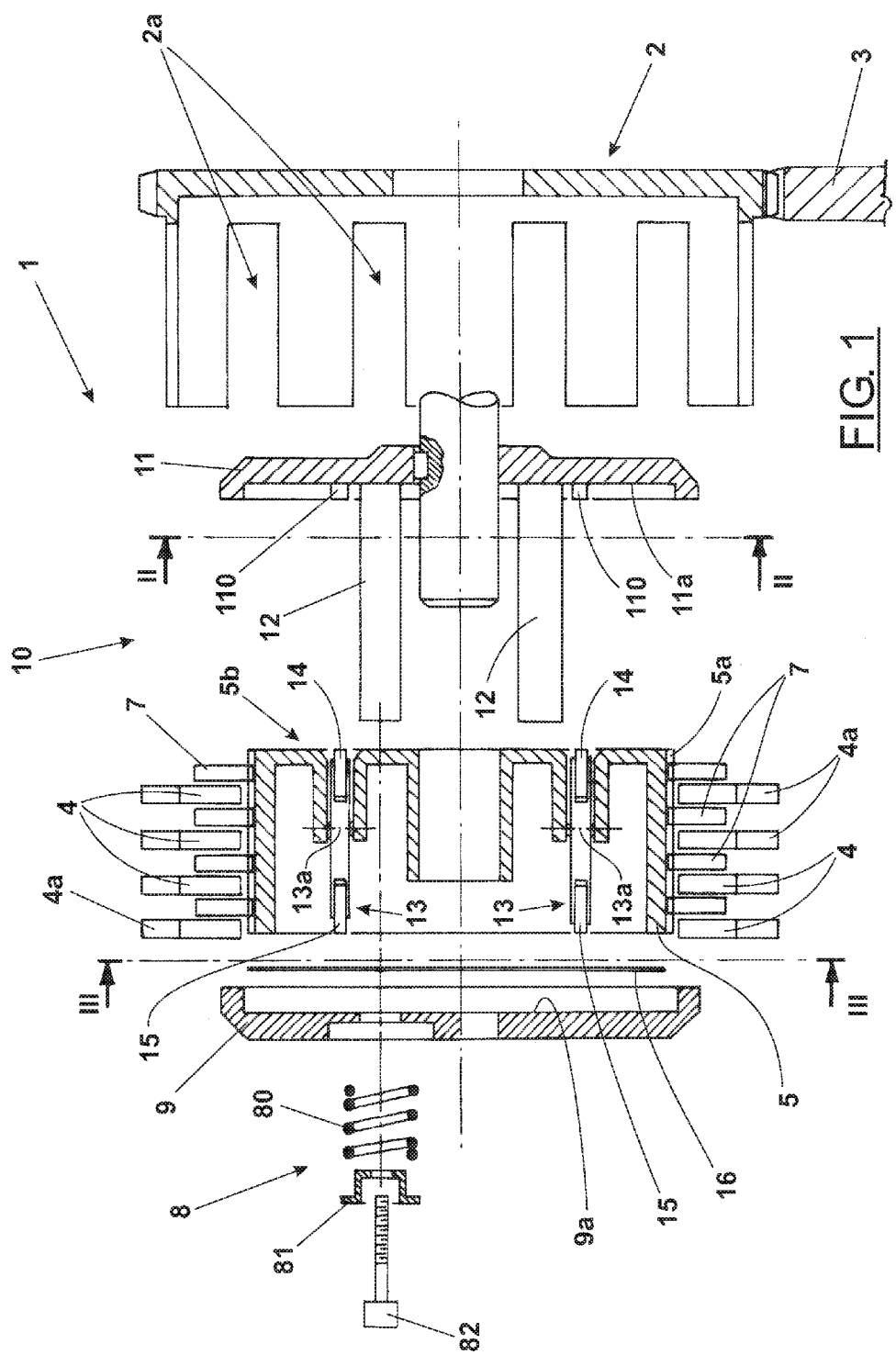
FIG. 1 shows a schematic axial cross-section of a multi-disk clutch, to which the device in question is associated, with an esplode view of the components.

In the figures listed above a multidisk clutch has been indicated, as a whole, with reference 1, and is inserted, in a per se known manner, in an engine, clutch and mechanical gearbox system (not shown) preferably associated to a motorcycle, also not shown. From the following description, however, it will be appreciated that the device 1 can be associated, without substantial variations, to any other type of vehicle, in which automatic progressive disengagement of a wheel, which could be blocked by the transmission means, is critical and should be started at an adjustable activation threshold.

The multidisk clutch 1 is manufactured in accordance with a conventional construction scheme, and has integrated therein, as hereinafter described, the device for the automatic disengagement of the present invention, indicated by reference 10.

The clutch 1, as already anticipated in the introduction, includes a basket 2, in mesh engagement with the crankshaft output 3, which firmly drive in rotation a first set of friction rings 4, which are placed within the basket 2 itself and are provided with high friction coefficient pads, for example sintered applied pads.

To achieve the connection, the rings 4 are provided with radial, outward extending projections 4a, which are inserted in corresponding slits 2a present in the basket 2.

A drum 5 is arranged coaxially inside the basket 2 and the first set of friction rings 4, and is associated with a gear shaft 6 (either primary or secondary one), as better specified hereinafter, and features, on its outer lateral surface, a toothing 5a, for example with straight cut teeth, with which a second set of friction rings 7 are engaged, which are interleaved with the rings 4 of said first set.

In their inner circumference, the rings 7 of the second set are suitably provided with a toothing (not shown in detail) complementary to that made on the drum 5.

A pressure plate 9 is axially associated to the drum, with interposition of spring-loaded members 8, so that it is elastically biased to compact and press the pack of the rings 4, 7 of said first and second sets, thus binding them to one another by friction.

The clutch 1 also comprises manually operated control means (not shown), designed to act on the pressure plate 9, against the elastic reaction of the spring-loaded members 8, to move it away from the pack of rings 4, 7 and cause the disengagement of the clutch 1.

According to the invention, the device 10 includes a ramped plate 11, associated coaxially to the drum 5 and keyed on the same gear shaft 6 (either the primary or the secondary one); the ramped plate 11 is so arranged to face the head 5b of the drum 5 facing the basket 2.

The ramped plate 11 has a series of studs 12 parallel to the shaft 6, which protrude to the inside of the drum 5 through respective arc-like slots 5*c* made in the latter. The arc-like slots 5*c* have a curvature radius concentric with the rotation axis of the same shaft (FIG. 3).

In the attached figures, by way of example, four studs 12 are shown, suitably arranged not to interfere with the means described hereinafter (FIG. 2).

Figure 6:
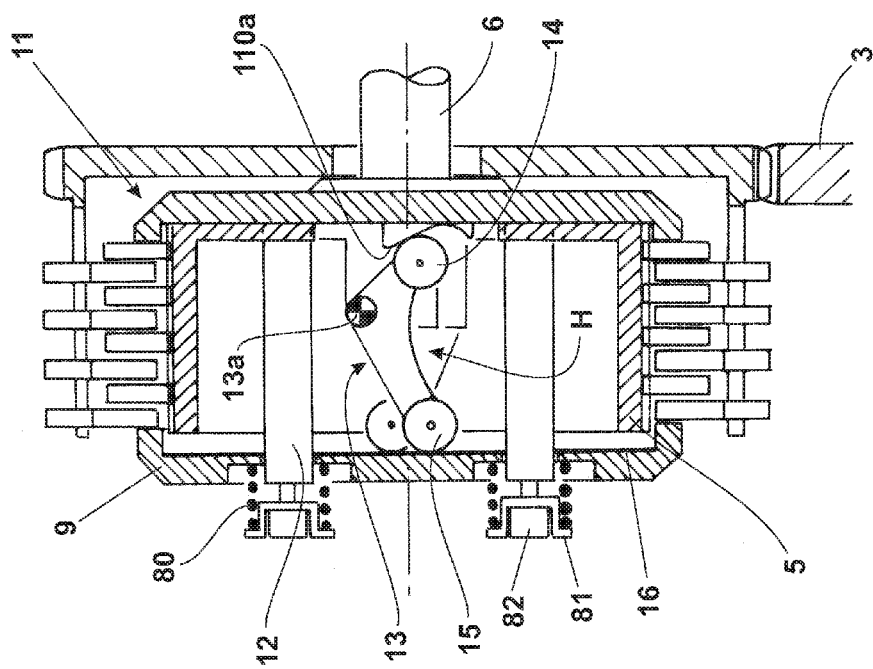
FIG. 6 shows a schematic axial cross-section of the clutch of FIG. 1, with the components assembled, in engaged condition and with the device inactive.
Figure 7:
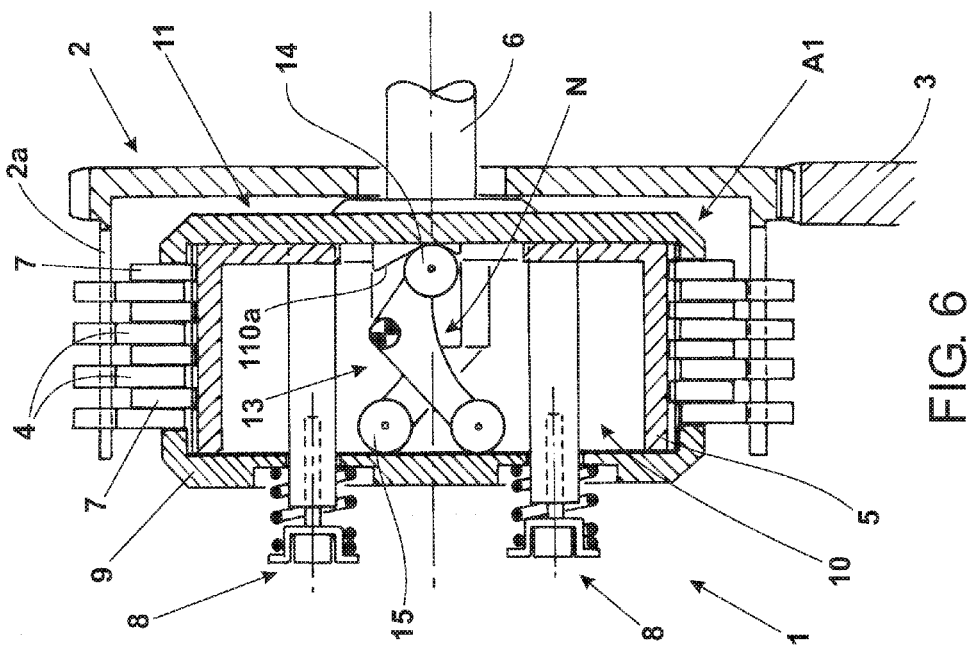
FIG. 7 shows a section similar to FIG. 6, with the clutch in disengaged condition determined by the active device.

The studs 12 are intended to couple with respective spring-loaded members 8, each of which consists, in the shown example, by a helical spring 80 which contacts, with one of its ends, the pusher plate 9, while the other, external end is held by a cup 81 with a hole in the center; a screw 82, inserted in the hole of the cup 81, engages with a threaded hole in the corresponding stud 12, so as to retain the assembly and create a preload to be provided for the spring 80 (FIGS. 1, 6, 7).

The studs 12 are also designed to maintain the drum 5 in its seat, through engagement with the arc-like slots 5*c*, allowing a limited rotation freedom to it with respect to the ramped plate 11, whose maximum angle is given by the length of the same slots 5*c*.

Two cam profiles 110 are made in the side 11*a* of the ramped plate 11 facing the inside of the drum 5, and define ascending ramps 110*a* progressively moving away from the side 11*a*.

The drum 5 supports in its interior at least two rocker arms 13, arranged in symmetrical positions at 180° from each other, not interfering with the stud 12. The rocker arms 13 are pivoted and oscillates about respective intermediate fulcrums 13°, which have axes perpendicular to that of the drum 5 itself. Each of them is provided, at opposite ends, of a first 14 and a second 15 bearing.

The first bearing 14 is intended to contact one of the aforementioned ascending ramps 110*a*. The second bearing 15 is intended to contact, directly or indirectly, as better explained in the following, the internal facade 9*a* of the pressure plate 9.

The bearings 14, 15 are preferably of the rolling type and are made, for example, with an alloy of bronze and beryllium, which makes them extremely hard and with self-lubricating characteristics.

In a preferred embodiment, between the second bearing 15 and the inner facade 9*a* of the pressure plate 9 at least one thrust shim 16, of selected thickness, is interposed.

The function of the shim (or shims) 16 is, firstly, to set the initial operation moment of the rocker arms 13 on the pressure plate 9. In fact, during normal running of the vehicle, in engaged condition of the clutch, the ends of the rocker arms 13 do not touch the surface of the shim; time for action of the rocker arms 13 is therefore dependent on the thickness of the shims 16, and therefore on the idle movement that the rocker arms 13 must make before touching the shims. Furthermore, the thickness of the shims 16 also affects the reaction of the helical springs 80 in the presence of a back torque from the rear wheel of the vehicle, and then the curve of activation of the device 10.

A single shim can be provided, which is calibrated to adjust the pressure exerted by the same pressure plate 9 on the pack of friction rings 4, 7 (FIG. 1). Alternatively, several different shims 16 may be provided with diverse thicknesses, to be coupled in compact condition in order to obtain different activation times of the rocker arms 13 on the pressure plate.

The body of each of the rocker arms 13 consists of two levers 131, 132, first and second respectively, extending in opposite directions from the intermediate fulcrum 13*a* up to corresponding first and second bearing 14, 15. In the embodiment shown herein, these levers are arranged mutually in a way as to form an angle less than 180°, but their angle can be varied according to specific needs.

In the preferred embodiment showns in the figures, the first lever 131 of each rocker arm 13 is also shorter than the second lever 132, such that the movement produced in the first bearing 14 by the corresponding ascending ramp 110*a* determines a movement amplified in the second bearing 15, as will be apparent hereinafter. Also in this case, this is a design choice, which can be varied according to the engagement progression required, up to make the second lever 132 shorter than the first lever 131, if necessary.

To change the functional characteristics of the device 10, i.e. the condition of activation (number of revolutions of the engine) and its gradualness (disengagement mode), the lever ratio between the levers 131, 132, the inclination of the ascending ramps 110*a*, the number and thickness of the thrust shims 16, the spring constant and the preload of the springs 80 can be changed, either individually or in combination.

Operation of the device 10 in question will be describe in the following, starting from the condition of engagement of the clutch 1 (FIG. 6), in which the pressure plate 9 keeps a close grip on the pack of the friction rings 4, 7 so the motor drags in rotation the gearbox, the transmission and finally the drive wheel without slippage.

This condition occurs when the motor vehicle proceeds with constant speed or is accelerated.

The ramped plate 11 is in a first angular position A1 with respect to the drum 5, such that the first bearings 14 of the rocker arms 13 are placed at the base of the respective ascending ramps 110°, thus determining, for the rocker arms 13 themselves, an inoperative position N.

The seconds bearings 15 skim the inner face 9*a* of the pressure plate 9, possibly with the interposition of one or more thrust shims 16, without exerting any pressure on the plate 9 itself, which remains fully subject to the action of the spring-loaded members 8.

In the transitional time immediately following the release of the accelerator by the motor vehicle driver, as already said, a back torque is generated, which goes back along the drivetrain of the transmission and is passed to the ramped plate 11, causing an angular shift thereof with respect to the drum 5, this being allowed by the arc-like slots 5*c*.

Such angular offset causes an equal rotation of the front cam profiles 110 with respect to the first bearings 14 of the rocker arms 13 in contact with the ascending ramps 110*a*, that impose a synchronous oscillation of the rocker arms 13 towards a respective operating position H, such that the second bearings 15 are pushed toward the pressure plate 9.

Consequently, this latter is moved away from the drum 5 and ramped plate 11, causing a reduction of the friction between the sets of rings 4, 7, and thus at least a partial automatic disengagement of the clutch 1 (FIG. 7).

Thus the release of the engine from the transmission is achieved, in advance with respect to when the driver operates the clutch lever, avoiding that, in the above mentioned transient time, the effect of the engine brake blocks the rear wheel of the vehicle, with the negative consequences on driving the same.

As soon as the driver accelerates again, the device 10 instantly returns in the engagement condition of the clutch 1, with the ramped plate 11 in the first angular position A1, the first bearings 14 placed at the base of the relative ascending ramps 110*a* and the rocker arms 13 in their inoperative position N (FIG. 6).

From the above, the peculiar characteristics of the subject device will be appreciated, by which the described automatic disengagement of the clutch can be obtained in a gentle and progressive way. This gives the vehicle which is provided therewith a better drivability and stability in wheel-raising, thus avoiding the known locking and hopping phenomena of the rear wheel, which occur during wheel-raising, for example, before a curve.

In particular, what above derives from the fact that disengagement (and the subsequent engagement) is due to the oscillatory movement of the rocker arms, which act with interposition of the bearings. Accordingly, this action occurs with a rolling friction and without axial displacement of the drum, thus without the need to overcome strong friction.

Another important, advantageous aspect of the device derives from its design, which allows it to be housed inside the drum. Thus no dimensional increases of the clutch is caused and no variations in the shape of the crankcase, in which the assembly is housed, is necessary.

From the foregoing description, it will be clearly appreciated by those skilled in the field, that the proposed device is easy to adjust, as described above, in accordance to the specific characteristics of the vehicle and/or preferences of the rider.

For normal road driving, the automatic disengagement device, properly aduste advantageously improves safety in lower grip condition of the tires on the asphalt, such as situations with wet asphalt or sand or gravel on the path of the vehicle. In the event of a sudden stop, in fact, the device prevents the rear wheel from docking, or makes it much less likely, and avoids the consequent loss of stability of the vehicle.

The simple construction of the device components keeps the production costs within acceptable limits, in absolute terms, and also advantageous as compared to the benefits offered.

It is understood, however, that what is described above is a non limiting example, therefore, possible variants of details that may be necessary for technical and/or functional reasons, are considered within the same protective scope defined by the appended claims.

The invention claimed is:

1. A device for the automatic disengagement of a clutch in an engine, clutch and gearbox system of a vehicle, said clutch including: a basket, in mesh engagement with a crankshaft output, designed to firmly drive in rotation a first set of friction rings, placed within the basket itself; a drum, mechanically connected to a primary or secondary gear shaft arranged coaxially within the basket provided, on an outer lateral surface thereof, with a toothing, with which a second set of friction rings are engaged, which are interleaved with the rings of said first set; a pressure plate, associated axially to said drum with interposition of spring-loaded members, designed to push the pressure plate to compact and press the pack of the rings of said first and second sets, thus locking them to each other by friction; manually operated control means, designed to act on the pressure plate, against the elastic reaction of said spring-loaded members, to move it away from the aforementioned pack of rings and cause the disengagement of the clutch, said device being characterized by comprising:

a ramped plate, interposed between said gear shaft and said drum, locked to the latter with respect to axial translations, but with the capability of limited angular offsets with respect to the same, due to corresponding studs protruding from said ramped plate and passing through arc-like slots made in the drum;

at least two cam profiles, made in a side of said ramped plate facing an inside of said drum, which define ascending ramps progressively moving away from said side;

at least two rocker arms, arranged inside said drum, pivoted to the latter at their intermediate fulcrums, the opposite ends of each of said rocker arm being intended to contact one of the aforementioned ascending ramps, respectively, and, directly or indirectly, said pressure plate, said rocker arm being adapted to oscillate simultaneously from a non operative position, corresponding to a first angular position of said ramped plate, in which said rocker arms do not interfere with the above mentioned pressure plate, to an operative position, determined due to the angular displacement of said ramped plate with respect to said drum, caused by a back torque generated by a drive wheel of said vehicle in conditions of abrupt deceleration, in which said rocker arms act on said pressure plate to obtain at least partial and progressive automatic disengagement of said clutch.

2. The device in accordance with claim 1, characterized in that each of said rocker arms is provided, at opposite ends, with bearings, designed to reduce friction produced by contact of said ends during the automatic disengagement of said clutch.

3. The device in accordance with claim 2, characterized in that said bearings of each rocker arm are of a rolling type.

4. The device of claim 2, characterized in that said bearings are made of a self-lubricating bronze and beryllium alloy.

5. The device in accordance with claim 1, characterized in that a body of each of said rocker arms comprises two levers, a first lever and a second lever respectively, which extend in opposite directions from said intermediate fulcrum up to corresponding first and second bearings, with the first lever and the second lever disposed mutually at an angle, the angle being less than one hundred and eighty degrees.

6. The device in accordance with claim 5, characterized in that said first lever of each rocker arm is shorter than the second lever, such that movement imposed to said first bearing by the corresponding ascending ramp causes an increased movement of the second bearing.

7. The device of claim 1, characterized in that said at least two rocker arms are arranged at one hundred and eighty degrees from each other and are oriented opposite to each other.

8. The device in accordance with claim 1, characterized in that there is provided at least one thrust shim, interposed between an inner side of the pressure plate and the ends of the rocker arms facing the pressure plate, the shim defining a time of intervention of said rocker arms on the pressure plate.

9. The device in accordance with claim 8, characterized in that a single shim is provided, which has a predetermined thickness, calibrated to provide a specific setting.

10. The device in accordance with claim 1, characterized in that it includes a plurality of shims, which have identical or different thicknesses, set in a pack in order to obtain an overall thickness, calibrated to provide a setting.

* * * * *